US007747956B2

(12) United States Patent
Zaner et al.

(10) Patent No.: US 7,747,956 B2
(45) Date of Patent: Jun. 29, 2010

(54) INTEGRATED EXPERIENCE OF VOGUE SYSTEM AND METHOD FOR SHARED INTEGRATED ONLINE SOCIAL INTERACTION

(75) Inventors: Melora Zaner, Seattle, WA (US);
Kathleen Mulcahy, Seattle, WA (US);
Erica Sanders, Seattle, WA (US);
Cesare John Saretto, Seattle, WA (US);
Eugene Zarahovsky, Seattle, WA (US);
Eugene Mesgar, Seattle, WA (US); Neel Ishwar Murarka, Seattle, WA (US);
Heather Ferguson, Centralia, WA (US);
Asta Glatzer, Redmond, WA (US);
Rama Ranganath, Seattle, WA (US);
Tammy Savage, Seattle, WA (US); John Vert, Seattle, WA (US); Linda Stone, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 11/379,638

(22) Filed: Apr. 21, 2006

(65) Prior Publication Data

US 2006/0190827 A1 Aug. 24, 2006

Related U.S. Application Data

(62) Division of application No. 10/230,247, filed on Aug. 28, 2002, now Pat. No. 7,234,117, and a division of application No. 11/379,640, filed on Apr. 21, 2006, now Pat. No. 7,689,922, and a division of application No. 11/379,647, filed on Apr. 21, 2006.

(51) Int. Cl.
*G06F 3/00* (2006.01)

(52) U.S. Cl. ........................ 715/751; 715/758; 715/759; 709/203

(58) Field of Classification Search ......... 715/751–759, 715/810; 709/203
See application file for complete search history.

(56) References Cited

U.S. PATENT DOCUMENTS 4,788,538 A 11/1988 Klein et al.

(Continued)

FOREIGN PATENT DOCUMENTS

GB 2378268 2/2003

(Continued)

OTHER PUBLICATIONS

U.S. Appl. No. 10/022,795, filed Jul. 25, 2002, Dinan, et al.

(Continued)

*Primary Examiner*—Tadeese Hailu
(74) *Attorney, Agent, or Firm*—Shook, Hardy & Bacon L.L.P.

(57) ABSTRACT

A novel application and user interface for facilitating group interactions over a network integrates messaging, file sharing, media playing, journaling, profiles, and gaming into a cohesive environment. The groups facilitated by the invention are persistent and mobile in that a user does not have to recollect and reconfigure the group each time he or she wants to interact with the group online and, while online, the group may be taken from one activity to another without having to disband and reconnect at the second activity. The application is modular so as to be extensible to include other activities and functionalities. In an embodiment, the group interaction application utilizes a peer-to-peer network environment to facilitate network communications between group members.

9 Claims, 14 Drawing Sheets

U.S. PATENT DOCUMENTS

| | | | |
|---|---|---|---|
| 5,793,365 | A | 8/1998 | Tang et al. |
| 5,880,731 | A | 3/1999 | Liles et al. |
| 6,016,146 | A | 1/2000 | Beer et al. |
| 6,041,335 | A * | 3/2000 | Merritt et al. ............... 715/203 |
| 6,078,948 | A | 6/2000 | Podgorny et al. |
| 6,081,830 | A | 6/2000 | Schindler |
| 6,177,935 | B1 * | 1/2001 | Munn ........................ 715/769 |
| 6,212,547 | B1 * | 4/2001 | Ludwig et al. ............. 709/204 |
| 6,225,996 | B1 | 5/2001 | Gibb et al. |
| 6,237,025 | B1 * | 5/2001 | Ludwig et al. ............. 709/204 |
| 6,248,946 | B1 | 6/2001 | Dwek |
| 6,298,374 | B1 * | 10/2001 | Sasaki et al. ............... 709/204 |
| 6,342,906 | B1 * | 1/2002 | Kumar et al. ............... 715/751 |
| 6,441,833 | B1 | 8/2002 | Anderson et al. |
| 6,564,246 | B1 * | 5/2003 | Varma et al. ............... 709/205 |
| 6,587,127 | B1 | 7/2003 | Leeke et al. |
| 6,636,889 | B1 | 10/2003 | Estrada et al. |
| 6,687,878 | B1 * | 2/2004 | Eintracht et al. ............ 715/201 |
| 6,745,178 | B1 | 6/2004 | Emens et al. |
| 6,865,713 | B1 | 3/2005 | Bates et al. |
| 6,868,169 | B2 * | 3/2005 | Staas et al. .................. 382/113 |
| 6,879,997 | B1 * | 4/2005 | Ketola et al. ................ 709/208 |
| 6,950,982 | B1 | 9/2005 | Dourish |
| 6,975,757 | B1 * | 12/2005 | Ohta .......................... 382/165 |
| 7,124,164 | B1 | 10/2006 | Chemtob |
| 7,130,884 | B2 | 10/2006 | Maehiro |
| 7,139,798 | B2 * | 11/2006 | Zircher et al. ............... 709/204 |
| 7,171,448 | B1 | 1/2007 | Danielsen et al. |
| 7,240,093 | B1 | 7/2007 | Danieli et al. |
| 7,353,252 | B1 * | 4/2008 | Yang et al. .................. 709/204 |
| 7,478,129 | B1 * | 1/2009 | Chemtob ..................... 709/204 |
| 2001/0002831 | A1 | 6/2001 | Kato et al. |
| 2002/0023132 | A1 * | 2/2002 | Tornabene et al. .......... 709/205 |
| 2002/0097267 | A1 * | 7/2002 | Dinan et al. ................ 345/757 |
| 2002/0101445 | A1 * | 8/2002 | Berque ....................... 345/751 |
| 2002/0120757 | A1 | 8/2002 | Sutherland et al. |
| 2002/0138552 | A1 | 9/2002 | DeBruine et al. |
| 2002/0143989 | A1 | 10/2002 | Huitema et al. |
| 2002/0188667 | A1 * | 12/2002 | Kirnos ........................ 709/203 |
| 2002/0188735 | A1 * | 12/2002 | Needham et al. ............ 709/229 |
| 2003/0023677 | A1 | 1/2003 | Morison Zuill et al. |
| 2003/0028595 | A1 * | 2/2003 | Vogt et al. ................... 709/204 |
| 2003/0055892 | A1 | 3/2003 | Huitema et al. |
| 2003/0058275 | A1 * | 3/2003 | Pilu et al. .................... 345/751 |
| 2003/0097408 | A1 | 5/2003 | Kageyama et al. |
| 2003/0160824 | A1 * | 8/2003 | Szumla ....................... 345/769 |
| 2003/0208534 | A1 * | 11/2003 | Carmichael ................. 709/203 |
| 2003/0220972 | A1 | 11/2003 | Montet et al. |
| 2003/0220980 | A1 * | 11/2003 | Crane ......................... 709/207 |
| 2003/0233650 | A1 | 12/2003 | Zaner et al. |
| 2003/0236835 | A1 | 12/2003 | Levi et al. |
| 2004/0088420 | A1 * | 5/2004 | Allen et al. ................. 709/229 |
| 2004/0111423 | A1 | 6/2004 | Irving et al. |
| 2004/0143603 | A1 | 7/2004 | Kaufmann et al. |
| 2004/0184445 | A1 | 9/2004 | Burne |
| 2005/0044503 | A1 | 2/2005 | Richardson et al. |

FOREIGN PATENT DOCUMENTS

| | | |
|---|---|---|
| GB | 2378268 A | 2/2003 |
| WO | 0120450 | 3/2001 |
| WO | 0120450 A2 | 3/2001 |

OTHER PUBLICATIONS

Boyer, Divid, et al., "Virtual Social Clubs: Meeting Places for the Internet Community", IEEE, pp. 297-301, 1999.

Greenberg, Saul, "Collaborarive Interfaces for the Web", Human Factors and Web Development, Chapter 18, pp. 241-253, LEA Press, ISBN 0-8058-2823-0, 1997.

Lee, Jang Ho, et al., "Supporting Multi-User, Multi-Applet Workspaces in CBE", In Proceedings of the ACM 1996 Conference on Computer Supported Cooperative Work, Boston, pp. 344-353, Cambridge, MA, 1996.

Greenberg, Saul, et al., "Using a Room Metaphor to Ease Transitions in Groupware", University of Calgary, Dept. of Computer Science, Technical Report (XP-002262492), 31pages, 1998.

Smith, Marc A., et al., The Social Life of Small Graphical Chat Spaces, In Proceedings of CHI 2000, The Hague, Netherlands, http://research.microsoft.com/scg/papers/vchatchi2000.pdf (Mar. 2000) pp. 1-8.

Cheng, Lili, et al., "Hutchworld: Lessons Learned. A Collaborative Project: Fred Hutchinson Cancer Research Center & Microsoft Research," In Proceedings of Virtual Worlds Conference 2000, Paris, France, http://research.microsoft.com/scg/papers/hutchvw2000.pdf, (Jun. 2000) pp. 1-12.

Kollock, Peter, "The Economies of Online Cooperation: Giftes and Public Goods in Cyberspace," Communities in Cyberspace, 1998 http://www.sscnet.ucla.edu/soc/faculty/kollock/papers/economies.htm, pp. 1-17.

Kollock, Peter, et al., "Managing the Virtual Commons: Cooperation and Conflict in Computer Communities," University of California, Los Angeles, http://research.microsoft.com/scg/papers/kollockv-chat.pdf (1998) pp. 1-30.

Farnham, Shelly, et al., "Supporting Sociability in a Shared Browser," In Proceedings of Interact Conference, Tokyo, Japan, http://research.microsoft.com/scg/papers/sharedbrowsinginteract.pdf (Jul. 2001) pp. 1-8.

Schmidt, Karin, et al., "A Generic System for Web-Based Group Interaction", IEEE, in the Proceedings of the Thirty-First Hawaii International Conference on System Sciences, pp. 545-554, 1998.

Kindberg, Tim, "Mushroom: A Framework for Collaboration and Interaction Across the Internet", in the Proceedings of the Fifth ERCIM Workshop on CSCW and the Web, 11 pages, 1996.

Dorohonceanu, Bogdan, et al., "A Desktop Design for Sychronous Collaboration", in Proceedings of the Graphics Interface '99 (GI'99), Kingston, Ontario, Canada, pp. 27-35, Jun. 1999.

Gutwin, Carl, "Workspace Awareness in Real-Time Distributed Groupware", The University of Calgary, Department of Computer Science, PH.D. Thesis, 250 pages, Dec. 1997.

Garcia, Octavio, et al., "Extending a Collaborative Architecture to Support Emotional Awareness", EBAA '99—Workshop on Emotion-Based Agent Architectures, 7 pages, 1999.

Cugola, Gianpaolo, et al., "Peer-to-Peer for Collaborative Applications", in Proceedings of the 22nd International Conference on Distributed Computing Systems Workshops (ICDCSW'02), IEEE 2002, 6 pages.

Duhr, "Oberflachenelemente in interaktiven und kooperativen anwendungen," Universitat Oldenburg, Department of Information Systems Thesis (Aug. 2000).

"At What Cost Pervasive? A Social Computing View of Mobile Computing Systems," IBM Research: vol. 38, No. 4, 1999, Pervasive Computing (28 pgs.).

Office Action dated May 13, 2008 for U.S. Appl. No. 11/379,647, 26 pages.

Bouvin. "Designing User Interfaces for Collaborative Web-Based Open Hypermedia", in Proceedings of the Eleventh ACM Conference on Hypertext and Hypermedia, May 30-Jun. 4, 2000, San Antonio, TX, pp. 230-231. ACM 1-58113-227-1/00/0005. Last accessed Oct. 17, 2008, 4 pages.

"Design Explorations," IBM Research: Social Computing Group. Last accessed Oct. 17, 2008, 4 pages.

"IBM Lotus Instant Messaging and Web Conferencing," (Sametime 6.5.1), IBM Software—IBM Lotus Instant Messaging and Web Conferencing home page. Last accessed Oct. 17, 2008, 3 pages.

Office Action dated Oct. 6, 2008 for U.S. Appl. No. 11/379,647, 17 pages.

OA dated Jul. 14, 2008 for U.S. Appl. No. 11/379,640, 22 pages.

OA dated Jan. 8, 2009 for U.S. Appl. No. 11/379,640, 19 pages.

OA dated Feb. 9, 2009 for U.S. Appl. No. 11/379,647, 18 pages.

\* cited by examiner

INTEGRATED EXPERIENCE OF VOGUE SYSTEM AND METHOD FOR SHARED INTEGRATED ONLINE SOCIAL INTERACTION

CROSS-REFERENCE TO RELATED APPLICATIONS

This application is a divisional of U.S. patent application Ser. No. 10/230,247 filed Aug. 28, 2002, now U.S. Pat. No. 7,234,117 entitled "SYSTEM AND METHOD FOR SHARED INTEGRATED ONLINE SOCIAL INTERACTION". This application is also related to divisional U.S. patent application Ser. No. 11/379,640, filed Apr. 21, 2006, now U.S. Pat. No. 7,689,922 entitled INTERGRATED EXPERIENCE OF VOGUE "SYSTEM AND METHOD FOR SHARED INTERGRATED ONLINE SOCIAL INTERACTION" and divisional U.S. patent application Ser. No. 11/379,647, filed Apr. 21, 2006, entitled, INTERGRATED EXPERIENCE OF VOGUE "SYSTEM AND METHOD FOR SHARED INTERGRATED ONLINE SOCIAL INTERACTION". The entireties of the aforementioned applications are incorporated herein by reference.

TECHNICAL FIELD

This invention relates generally to communication and interaction over a network connection and, more particularly, relates to a system and method for facilitating online interactions among small groups of two or more communicating parties.

BACKGROUND OF THE INVENTION

The advent of the Internet and other networks has rapidly caused a migration of many everyday tasks from the physical world to the digital world. For example, communications that would in years past have been memorialized on paper and sent via a mail carrier are now typed electronically and transmitted digitally over a network to the recipient almost instantly. The physical exchange of money during transactions is becoming less frequent, and the virtual electronic exchange of funds over networks has become much more prevalent. Indeed, the execution of transactions can now take place entirely online, such as over the Internet. All in all, many activities that used to require physical presence and physical interaction can now take place over a network between remote parties who would otherwise be unable to effectively communicate.

With the coming of the digital age, the one activity that has not migrated strongly from the physical world to the digital one has been the group interaction. While there exists a number of mechanisms and forums for a digital communication between remote parties, none of these has provided a compelling solution that can lead to widespread use and growth. The existing communications mechanisms all fail in a number of regards to provide a true online group experience. For example, no such technologies provide a true group space within which the group members may explore and experience with each other through a wide range of activities. Rather, many existing technologies tend to focus on a single activity or endeavor, such as gaming or file sharing, rather than on the group and its activities and communication. Other technologies allow group chatting, but have no true sense of groups, requiring setup of the group each time a group chat is attempted, and providing no mechanism for transitioning the group to an activity other than pure chatting without again manually setting the group up at the next activity.

While many chatting programs allow contacts to be grouped into "buddy lists," this set of contacts does not necessarily know of each other's existence nor do they necessarily share activities with each other. In other words, the only sense of community is unilaterally imposed by one user onto his or her contacts. Furthermore, this grouping of contacts is a mere listing and does not facilitate group activities or interaction, further impeding the development of a sense of community.

In short, existing online interaction mechanisms do not provide a mechanism for fostering or accessing an intimate persistent relationship within a small select group of users. Moreover, the lack of group mobility provided by existing mechanisms further serves to distinguish such systems from real-world physical relationships, and thus further serves to isolate the user hoping for significant online interaction.

There thus remains a need for an online group communication application through which an intimate group of users can interact with each other in any number of ways, and through which users can access, nurture, and develop their shared relationships with one another. Such a system would finally provide the Internet generation with the online social connection and shared relationships that they now lack.

SUMMARY OF THE INVENTION

The present invention is directed to an application and user interface for facilitating group interactions over a network. The application and interface are tailored to provide users with a clear sense of which of their friends are online and available for interactions, a sense of what activities a group to which they belong is engaged in, and an overall heightened feeling of connection with the group. As the group evolves over a period of time, the group can change in size and can also develop a collective history and potentially a collection of group artifacts that have been generated or acquired by the group during their sessions. The group interaction application integrates familiar concepts such as messaging, file sharing, media playing, journals, profiles, and gaming into a cohesive environment that enhances a feeling of group identity among users.

The groups facilitated by the invention are both persistent and mobile. The persistence of a group means that a user does not have to reconstruct and reconfigure the group each time he or she wants to interact with the group online. Rather, the group retains its identity while offline, and any member may access the group simply via the user interface. The mobility of a group means that while online, the group may be taken from one activity to another without having to disband and reconnect at the second activity. Another way to view this aspect of the application is to consider the second activity to be automatically pre-populated with the group members. This pre-population eases the transitioning of the group between activities, thus improving the likelihood that the group will engage in a wider range of activities, and also conveying a sense of permanence of the group.

In an embodiment of the invention, the group interaction application utilizes a peer-to-peer network environment to facilitate network communications between group members. However, any networking technology may alternatively be used, including hybrid networks or non-peer-to-peer networks. The application is further configured to be modular so that it is extensible to include other activities and functionalities as desired by consumers and as provided by third party developers.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
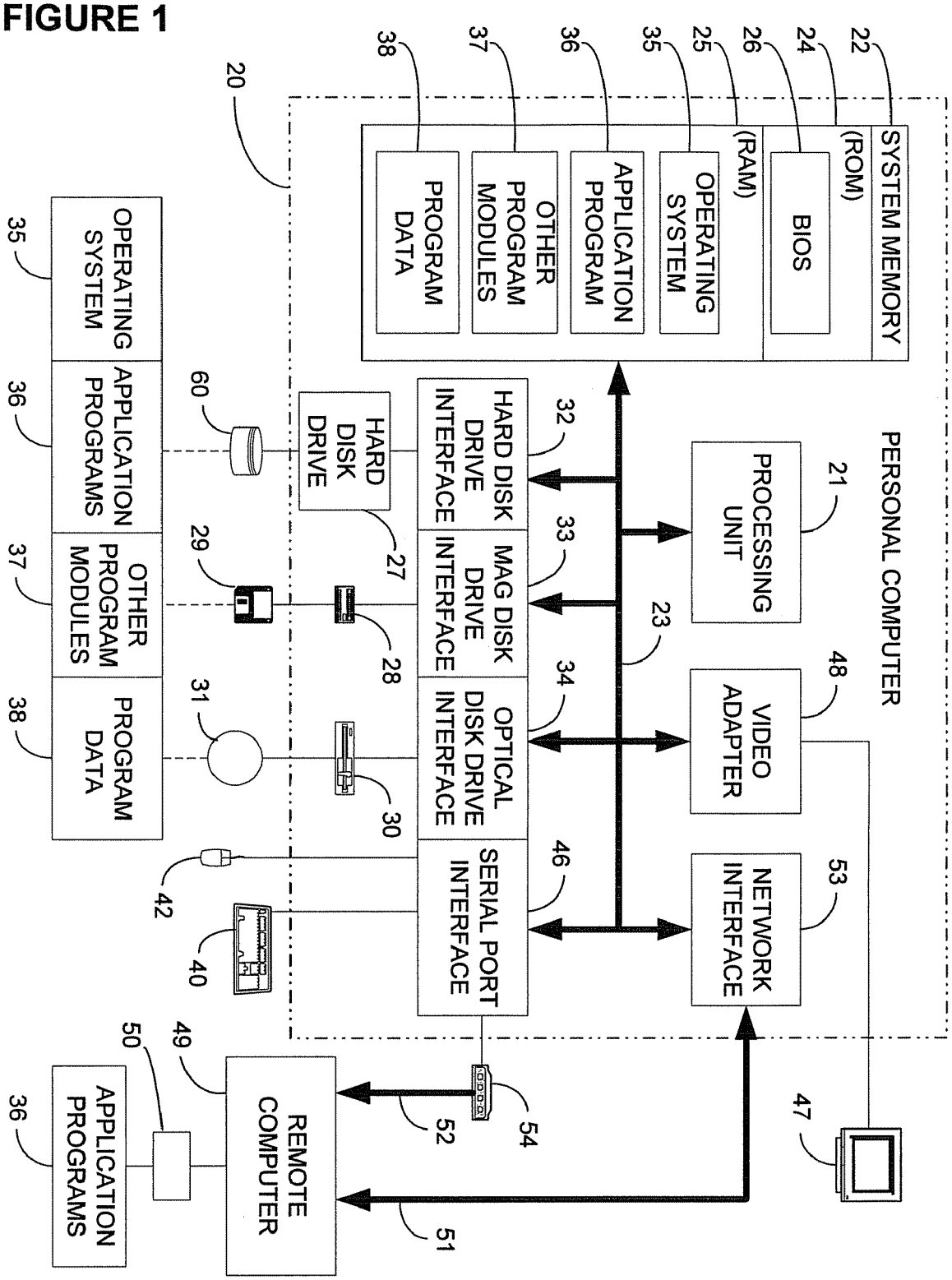
FIG. 1 is a schematic diagram generally illustrating an exemplary computer system usable to implement an embodiment of the invention.

Turning to the drawings, wherein like reference numerals refer to like elements, the invention is described hereinafter in the context of a computing environment. Although it is not required for practicing the invention, the invention is described as it is implemented by computer-executable instructions, such as program modules, that are executed by a computing device. Generally, program modules include routines, programs, objects, components, data structures and the like that perform particular tasks or implement particular abstract data types.

The invention may be implemented in many different computing device configurations. For example, the invention may be realized in hand-held devices, mobile phones, multi-processor systems, microprocessor-based or programmable consumer electronics, network PCs, minicomputers, mainframe computers and the like, wearable computing or communication devices, and any other device capable of both visual display and direct or indirect communication with another device. The invention may also be practiced in distributed computing environments, where tasks are performed by remote processing devices that are linked through a communications network. In a distributed computing environment, program modules may be located in both local and remote memory storage devices. Thus it will be understood that the invention is preferably incorporated into many types of computing environments as suggested above.

Before describing the invention in greater detail, an example computing environment in which the invention may operate is described in connection with FIG. 1. The computing device 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in ROM 24. The computing device 20 may further include a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the PC 20. Although the exemplary environment described herein employs a hard disk 60, a removable magnetic disk 29, and a removable optical disk 31, it will be appreciated by those skilled in the art that other types of computer readable media which can store data that is accessible by a computing device, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the device 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, the computing device typically includes other peripheral output devices, not shown, such as speakers and printers.

The device 20 is operable in a networked environment using fixed or transient logical connections to one or more remote computing devices, such as a remote computer 49. The remote computer 49 may be another similar computing device, a server, a router, a network PC, a peer device or other common network node, or any other device type such as any of those mentioned elsewhere herein, and typically includes many or all of the elements described above relative to the computing device 20, although there is no such requirement, and only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computing device 20 is connected to the local network 51 through a network interface or adapter 53. When used in a WAN networking environment, the computing device 20 typically includes a modem 54 or other means for establishing communications over the WAN 52. The modem 54, which may be internal or external, is connected to the system bus 23 via the serial port interface 46. Program modules depicted relative to the computing device 20, or portions thereof, may be stored in the remote memory storage device. It will be appreciated that the network connections shown are exemplary and other means of establishing a communications link between the computers may be used. Additionally, the invention is not intended to be limited to a particular network type. Any network type, wired or wireless, fixed or transient, circuit-switched, packet-switched or other network architectures, may be used to implement the present invention.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
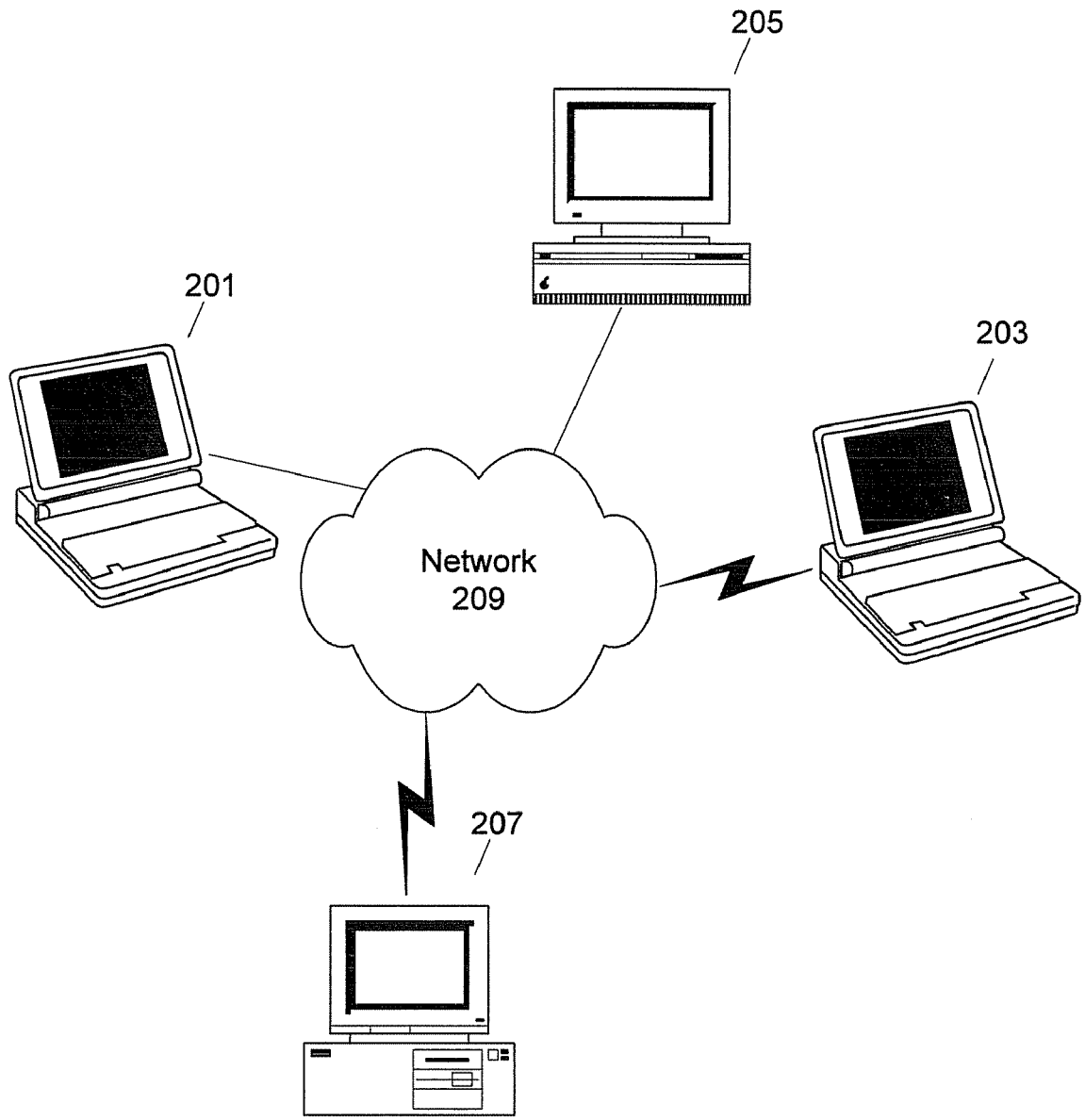
FIG. 2 is a schematic diagram illustrating an exemplary network environment for communications in an embodiment of the invention.

FIG. 2 is a schematic diagram of a network environment within which an embodiment of the invention may be implemented. In particular, a plurality of user devices 201, 203, 205, and 207 are illustrated as being communicably linked via a network 209. Each user device will typically be used by or associated with a different user. The exact number of user devices so linked is not important for the present invention, although a network communication will typically involve at least two users, and although the invention has its greatest benefits when applied to small groups, such as approximately fifteen or fewer users. Note that the number of group members involved during audio sharing should be limited when necessary to avoid a violation of any copyright pertaining to the shared audio material. Furthermore, the type of network 209 is not critical, and may be peer-to-peer, server-based, a hybrid of the two, or any other type of link or network that allows an exchange of information, directly or indirectly between two or more user machines, although a wholly or partially peer-to-peer network is presently preferred for implementation. Via the network 209, a communication from one user may be transmitted to another user or users (via their respective user devices). The user machines 201, 203, 205, 207 typically will be remote from one another geographically although such is not required.

One or more user machines used to implement an embodiment of the invention may be as illustrated with respect to the computing device architecture of FIG. 1, although there is no such limitation inherent in the invention. It is contemplated that an implementation of the invention will additionally or alternatively be used with any of a number of other communication device types, including but not limited to wearable communication devices, cell phones, and PDAs.

The user interface in an embodiment of the invention is tailored to give the user a clear sense of whom among their group of friends is online, a sense of what activities the group is engaged in, and an overall sense of connection with the group. As the group evolves over time, the group may change and may also develop a collective history and potentially a collection of group artifacts. The group interaction application thus integrates familiar concepts such as messaging, file sharing, media playing, journals, profiles, and gaming into a cohesive environment that fosters group identity while potentially also cultivating individual relationships within the group.

Figure 3:
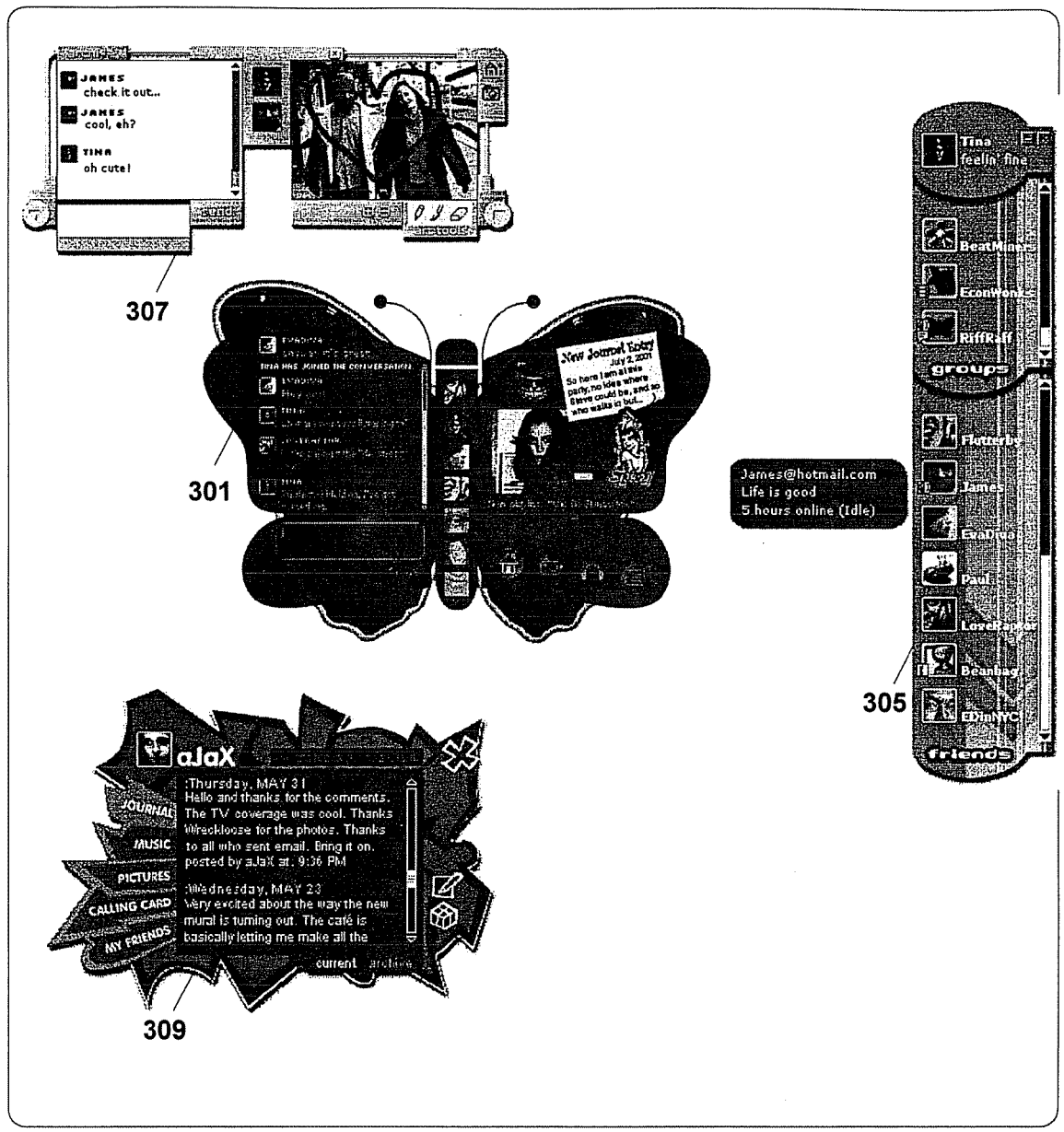
FIG. 3 is a display screen representation showing a number of user interface elements that may be presented individually or together by the application according to an embodiment of the invention.

One overall user interface presentation according to an embodiment of the invention will be described with reference to FIG. 3 before describing individual features in greater detail. The screen display 301 according to an embodiment of the invention comprises one or more of a number of elements, all designed to further the group experience. Predominantly, a group space 303 provides a central place for interacting with the group. Note that a particular user may have more than one group to which he or she belongs, and that each member of a group may belong to a group or groups to which one or more other members do not belong. Thus, although the relevant group space 303 appears to each group member, and appears identically on each machine, there may be portions of a user's screen display that are not shared with other group members. Thus, for example, the screen display 301 further may comprise, additionally or alternatively another group space 307 that pertains to a group that contains the user associated with the display and at least one other party. In addition to one or more group spaces 303, 307, a number of other graphical features may be provided in the display 301 within embodiments of the invention. For example, a group bar 305 displays character images corresponding to the user, their groups and friends (a friend essentially pertains to a group of two, the user and the friend), and has other features as well, as will be discussed in greater detail below. Finally, the display 301 may also include a personal space 309, such as of a party other than the user, so that the user may become more familiar with the individual associated with the space 309. Various features and embodiments of the personal space 309 will be discussed in greater detail below.

Figure 4A:
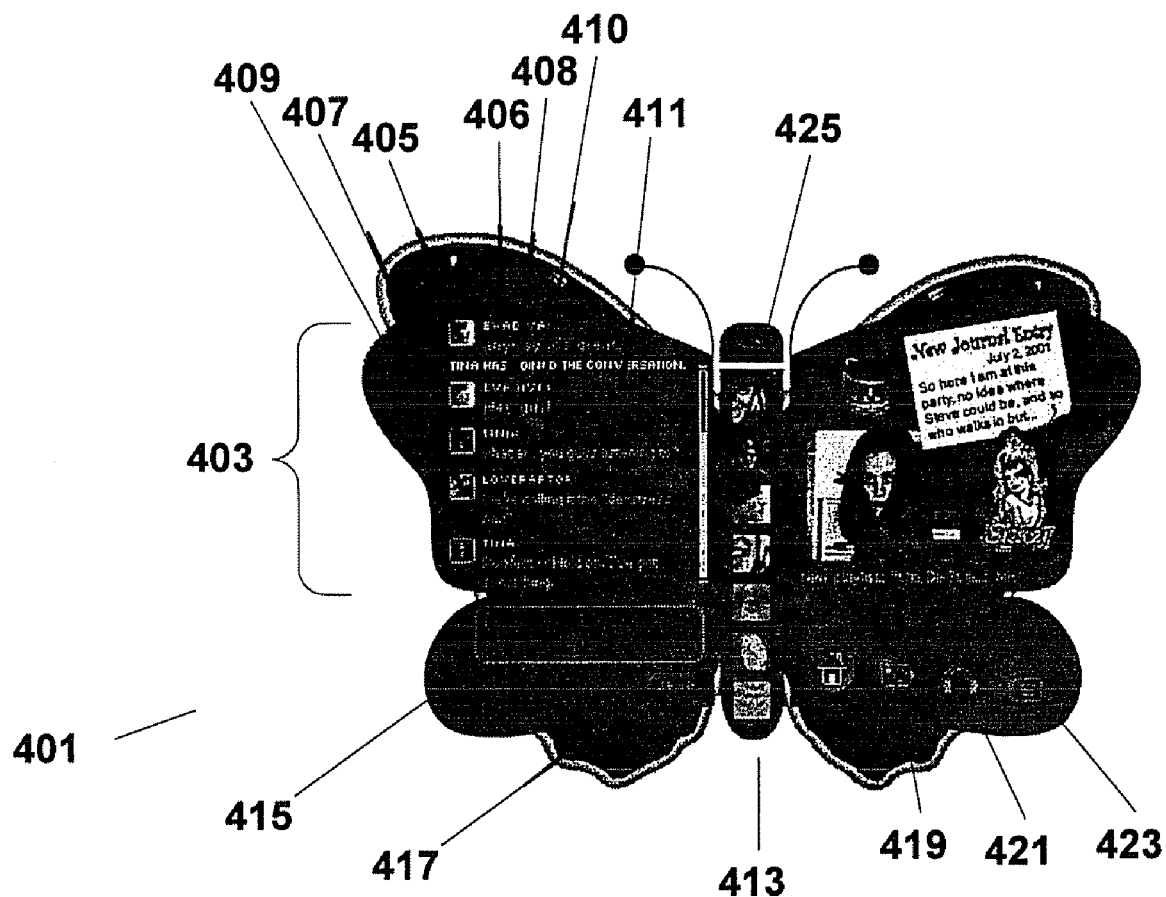
FIG. 4A is display screen representation of a group space user interface element according to an embodiment of the present invention.

FIG. 4A illustrates a group space 401 in greater detail. The shape of the group space is that of a butterfly, although the appearance of the space is customizable both as to shape and interior pattern, or "skin." A library of group space shapes and skins is preferably made available to a user, such as through series of menu items, so that each group member may customize the appearance of the group space. The shapes and/or skins may be organized into themes, so that a user can pick a particular theme, such as "agriculture," and have the appearance of the group space 401 change accordingly. In addition to providing users with pre-generated shapes and skins, users may customize their group space with shapes and skins of their own design in an embodiment of the invention. Note that in order to preserve the true group nature of the group space 401, any change to its appearance by one group member is preferably propagated to each other member machine in an embodiment of the invention so that each group member sees essentially the same group space 401 as every other group member, although such is not required.

The group space is flexible and modular, as will be described hereinafter, however an exemplary set of group space features is illustrated within the group space 401 of FIG. 4A. Another exemplary group space will be described with respect to FIG. 5. The left side of the group space 401 incorporates a messaging or dialog area 403. The dialog area 403 displays lines of a conversation between group members in essentially real-time (according to network transmission and receipt capabilities), in much the same way that a transcript records a spoken conversation. In an embodiment of the invention, each contributor types a sentence or contribution in the entry area 415. Once the contribution is complete, the member actuates a send button 417 or other actuator so that his or her contribution appears in every member's group space display in the dialog area 403. In an alternative embodiment of the invention, each contributor's keyboard input in the dialog area 403 is displayed at each group member machine as it is entered. In this way, the contributing user can see their entry as they type, and still each group member is able to see what each other group member, including the contributor, can see. Generally, network bandwidth constraints will favor the former approach.

In order to let each member know who the "speakers" are in the current dialog, a character 405, 407, 409 and name 406, 408, 410 associated uniquely with each member appears next to that member's contributions in the dialog area. The character may be a photograph, drawing, or other graphical material chosen by the user to represent their identity and personal style to the group. The name may be the member's actual name, or may be any other name chosen by the member. This level of customizability allows the group members greater freedom in expressing themselves to the group, a freedom that is valuable to the generation that most typically utilizes the Internet for entertainment purposes.

In addition to the characters 405, 407, 409, names 406, 408, 410, and the dialog itself, other information may also appear in the dialog area 403. For example, when a group member joins the conversation, such as by clicking in the dialog area 403, a notification 411 will be presented in an embodiment of the invention to indicate that the user is now engaged in the conversation. The group space 401 supports file sharing capabilities in an embodiment of the invention. Such sharing is preferably achieved by the dragging and dropping of a file onto the group space 401 by one member. In such a situation, a notification can appear inline in the dialog area 403 to let the other members know that the file is available. In addition to the various controls for directing and interacting with the group session, the group space 401 may also incorporate window controls, such as close control 425. In an embodiment of the invention, the close control 425 serves not only to close the window corresponding to the group space 401, but also to end the user's session with the group.

Figure 4B:
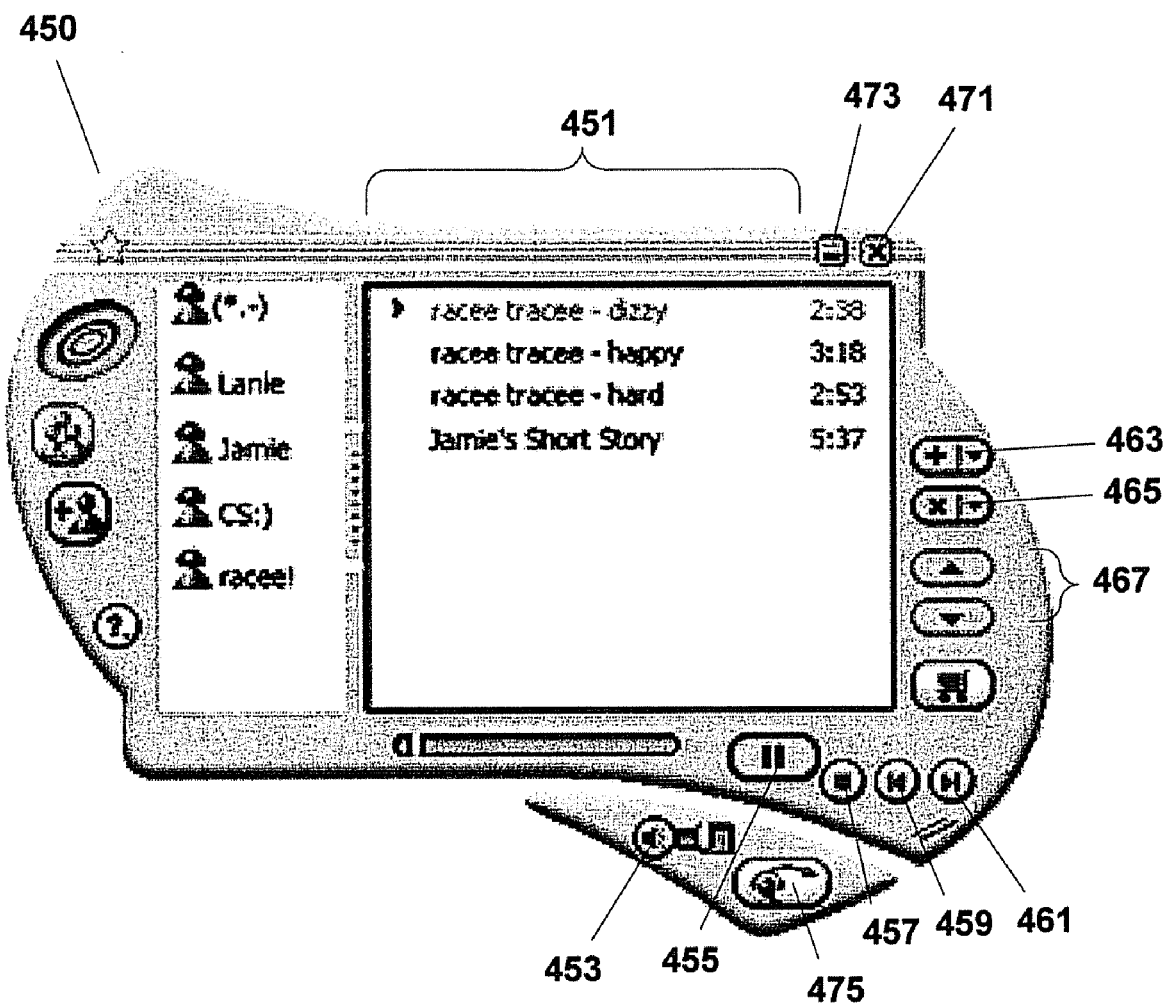
FIG. 4B is display screen representation of an audio sharing activity space user interface element according to an embodiment of the present invention.

Another exemplary feature of the group space 401 in an embodiment of the invention is a list or array 413 of group member characters located centrally in the group space 401. The characters 413 are typically the same as the characters used to identify speakers in the dialog area 403, and may represent all group members, or instead only those group members that are currently online. A series of activity selection icons 419, 421, 423 is preferably made available so that the user may easily select an activity to which to take the group. For example, by selecting the audio icon 421, the user can introduce the group to an audio sharing activity. When a user opens an audio activity for the group, the entire online membership of the group is automatically taken to the audio activity via their respective displays. In other words, the resultant audio activity display appears on each member's screen as shown in FIG. 4B. Note that the activity selection may instead be made in an embodiment of the invention indirectly via another type of control, such as a menu that once selected yields a drop down list of activities for further selection.

The resultant display 450 preferably incorporates a play list 451 identifying material to be played and any desired related information such as duration of play as is shown in FIG. 4B. The display 450 also preferably includes audio controls for controlling the play of the audio material, such as volume 453, pause 455, stop 457, rewind 459, and fast forward 461 controls. Each member is preferably able to alter the play list by adding or deleting items and by controlling the current item being played. Thus an item add control 463 and an item remove control 465 are preferably provided. Cursor keys 467 are used in an embodiment of the invention to select the play list item of interest. A notifier 475 can be used to signal to other members whether or not a particular user is tuned in to the audio activity. As with many other window types, the audio activity window 450 preferably also includes a close control 471 and a minimize control 473.

The audio material shared in the audio activity may be obtained from any source, including local memory, remote memory, a server, a peripheral audio device, and so on without limitation. In one embodiment of the invention, it is desirable to provide a "buy" button 469 actuatable by a user to purchase a proprietary audio item, such as may be currently selected in the play list 451. In this way, the user can listen to the purchased item even when the group member that played the item in the group audio activity is not online, or when the user wishes to listen in private or with another group.

Figure 5:
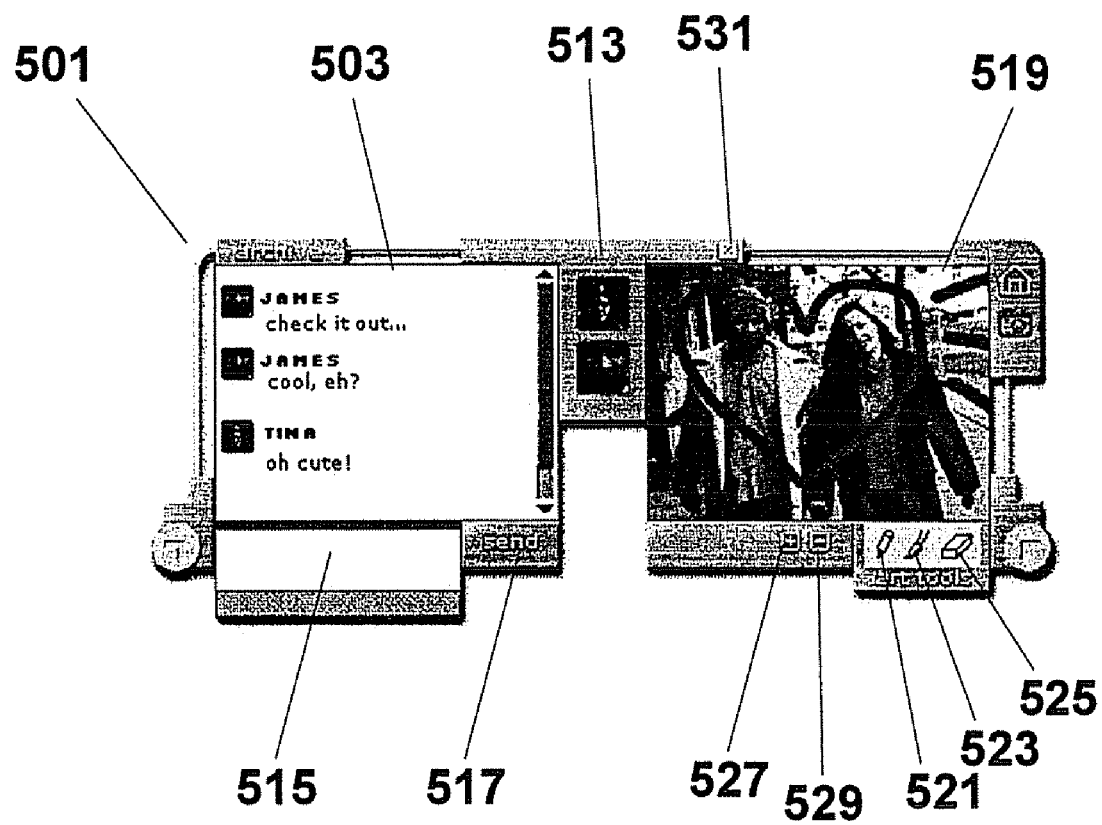
FIG. 5 is display screen representation of an alternative group space user interface element according to an embodiment of the present invention.

The group space 401 of FIG. 4A represents one of a number of potential group space appearances and configurations. An alternative group space configuration 501 is shown in FIG. 5. In the group space 501 of FIG. 5, two group members are currently online, as indicated by the two characters in the character list 513. One of the group members has directed the group to a photo activity, wherein a photograph 519 may be shared and drawn upon, or annotated. Note that a dialog area 503 is open, with an attendant entry area 515 and send button 517, and is usable during the photo activity, as it may be in any group space configuration and activity depending upon designer preferences.

Art tools are available for selection by each member in order to annotate the photograph 519. In particular, a pencil tool 521 allows the user to "draw" on the photograph, while a paint tool 523 allows the user to "paint." The user may use an eraser tool 525 to erase any annotation already on the photograph 519. Other controls are preferably provided within the photo activity group space window 501 as well. For example, an add button 527 is usable to add a new photograph to the window, while a subtract button 529 serves to remove a photograph from the window. Similarly, a close control and a minimize control may be provided, although only a close control 531 is shown in the figure. The photograph 519 or photographs used in the photo activity may be obtained from any conventional source or otherwise, such as from a scanner, from a network interface, from local or remote memory, or any other device or facility usable to store or transfer an image.

Figure 6:
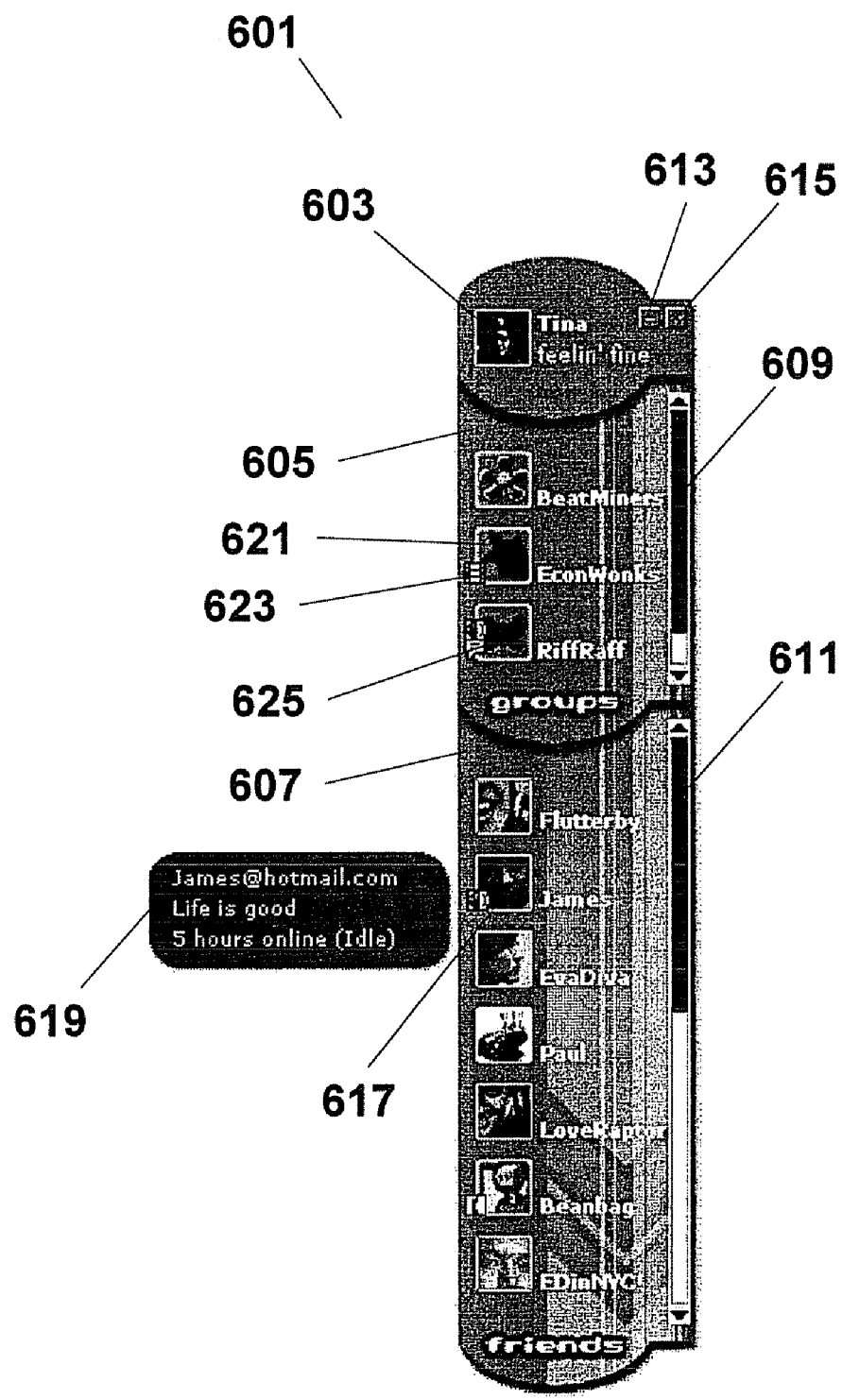
FIG. 6 is display screen representation of a group interaction application access bar or group bar user interface element according to an embodiment of the present invention.

Another graphical item associated with the group space and its underlying application in an embodiment of the invention is a group bar 601, as shown in FIG. 6. The group bar 601, which can be skinned to reflect the user's personal style, serves to display a user's self, their groups, and their friends. The display of the various entities is preferably accomplished by displaying the associated name and character or other graphical element. Each set of entities appears in its own area of the bar 601. Thus, the user appears as a character and name in a first section 603, their groups appear as characters and names in a second section 605, and the user's friends appear as characters and names in a third section 607. Because the group bar 601 is preferably limited in size to remain fairly unobtrusive on the desktop, the number of characters and names in a given field 603, 605, 607, may be limited, with scroll bars 609, 611 being usable to view any presently unseen items. In an embodiment of the invention, the friend and group items in the group bar 601 are ordered within their sections 605, 607 via dynamic list ordering.

In addition to the various controls, sections, and features of the group bar 601 already discussed, there are also preferably provided typical window controls as needed, such as a minimize control 613, and a close control 615. Other window controls and options may be provided in various implementations. For example, a selectable help item may be provided so that a user can access aid in operating the application when needed.

The group bar 601 is preferably usually maintained on the user's desktop or other display by the group interaction application, even when the user is not actively in communication with any friend or group member, as a reminder of the relationships and more importantly as a point of contact to, and information about, the friends or groups. The user can utilize the group bar to manage their social interactions by setting a mood, mode, and status. In particular, the user's chosen mood appears in the self area 603 adjacent to their name and character (such as "feelin' fine" in the figure) and is available to other friends or group members. For example, by hovering the cursor over James' friend icon 617, Tina (the current user as identified in the self area 603) is able to view James' mood, "Life is good," in a pop-up window 619. In addition to setting mood, users are also able to set a mode. For example, Tina may choose for social management purposes to appear as offline to all or some of her friends and group members. It can be seen from the pop-up window 619 that James' mode is "online," at least with respect to Tina. Various modes include invisible (i.e. offline), work mode, or any other mode that the user may choose to project. The status of the user lets other friends or group members know more about what that user is involved in. For example, James' status appears to Tina as "Idle."

As noted, the group bar 601 serves as a point of contact from the user to their friends and groups. From observing the appropriate items in the group bar 601, the user can determine what if anything each friend or group is involved in. For example, it can be seen by Tina that the EconWonks group, represented by the item 621, is viewing video material such as an animation or video segment, represented by the activity icon 623. Similarly, it can be seen that the RiffRaff group, represented by item 625, is listening to audio material and chatting.

The user, in this case Tina, can use the group bar 601 to join in a current group session or to start a session. For example, by mouse-clicking on a group icon, the relevant group space appears on Tina's screen, in the case of an ongoing session. With respect to a new session a group space appears, and other group members can see, via their respective group bars, the activities of Tina within the group space. As noted above, the group space itself also provides an avenue, through the character list, for contacting group members, such as to invite them to join in a session.

There are a number of other possible implementations for a launch point for the group interaction application. For example, a simplified launch point may not be configured as a bar, but may instead appear as another shaped space, having tools and features situated thereon. Such a space can incorporate many of the aspects of the group space and the group bar. For example, the space can include selectable controls for modifying its appearance, closing and minimizing it, accessing help, accessing an existing group or initiating an ad hoc group centered on a selected activity, accessing a library of received greetings, and so forth. Other controls and features may be included in addition to or instead of those described, and the shape of the space may be any shape desired by the designer. The alternative launch point can provide a way to more explicitly expose a user to the range of features supported by the group interaction application, providing an easier start-up experience for the user.

Figure 7:
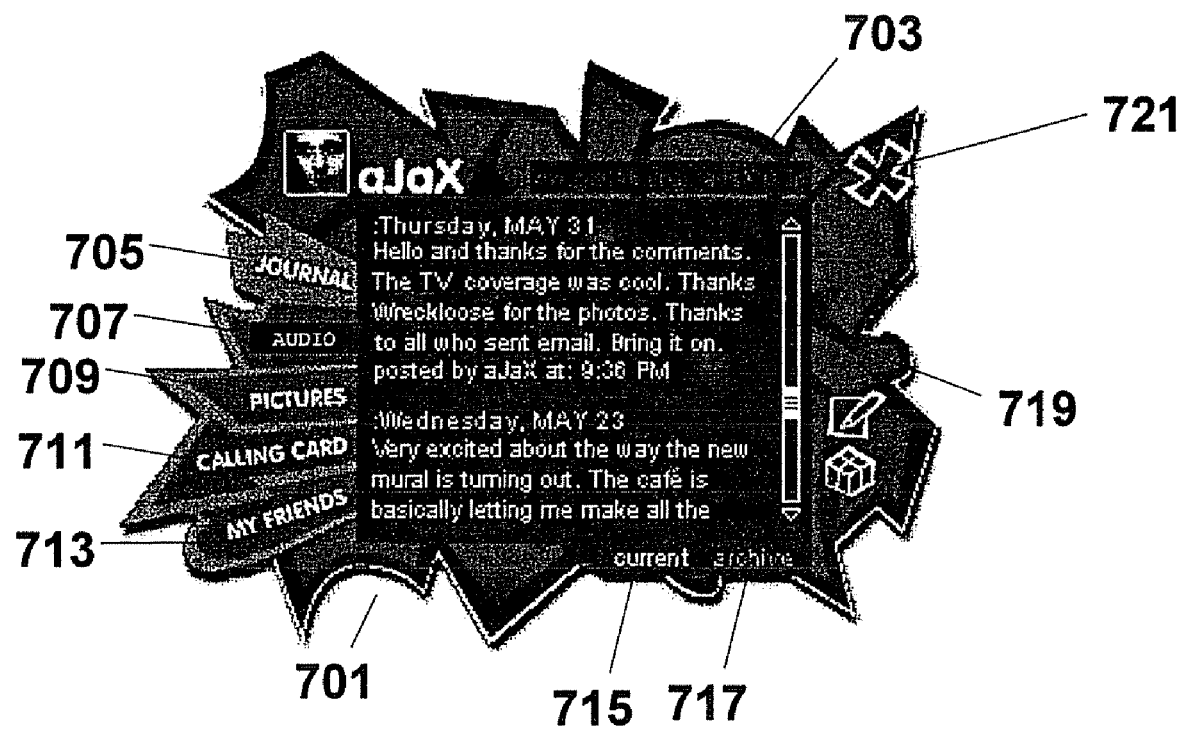
FIG. 7 is display screen representation of a personal space user interface element according to an embodiment of the present invention.

A further graphical item associated with the group space and its underlying application in an embodiment of the invention is a personal space 701, as shown in FIG. 7. The personal space 701 is a place for its owner to privately express herself or himself through art, audio material, pictures, a social network, and a journal. The journal 703 is the central aspect of the personal space 701, providing a written record of the drafter's thoughts and feelings. The journal as well as the other features of the personal space 701 are accessible via tabs in an embodiment of the invention. Thus there is presented in the personal space 701 a journal tab 705 to access the journal 703, an audio tab 707 usable to access any music hosted in the space 701, a pictures tab 709 usable to access any hosted pictures, and a calling card tab 711 usable to access the owner's calling card. The calling card is a card that may be distributed by its owner to convey information about the owner and their interests. Finally, the personal space also includes a "my friends" tab, which can be actuated to display the owner's social network, i.e. the friends and groups with which the owner is associated. The journal 703 includes date frame selection controls, e.g. a "current" control 715 usable to view the current journal entries, and an "archive" control 717 usable to view archived journal entries. Whichever version of the journal is viewed, a scroll bar 719 may also be provided to allow the viewer to scroll through the journal material. Finally, the personal space 701 also includes other windows controls where appropriate, such as close control 721, which is usable to close the space 701.

Note that the personal space 701 is by definition personal. Accordingly, it is not freely viewable by all parties, including group members or friends associated with the owner. Rather it is available only by permission of the owner, and thus serves to introduce a more intimate level of connection when circumstances warrant. Thus, if the owner is involved in a group session and shares his or her personal space with one other group member, the remaining members of the group will not be able to see the space. It is also contemplated that the owner may permanently or for certain periods view the personal space privately without sharing it in any way with another party.

Just as in the physical world, users of the group interaction application and its related features will expect their relationships to evolve over time, acquiring a sense of history and group identity. This objective is furthered via support in the group space 401 for both the acquisition of group artifacts and the accumulation of group history. With respect to group history, the group history is maintained so that a user may go back and look at what has occurred, in terms of selected or significant events, within the group. Thus, notifications (file received, greeting received, new member joined group, file download complete, file no longer available) are stored and may be perused and kept or deleted. This may especially useful when a user has left their computer momentarily and an event occurs while they are absent. Preferably the stored history at a particular user's machine is cleared wholly or partially, such as of all greeting notifications, when the current group session is terminated with respect to that user. In this manner, the group history file size is limited to a reasonable level.

The storage location for the group history is preferably the peer-to-peer file cache when the invention is implemented in a wholly or partially peer-to-peer network environment, although such is not required. If the cache file size is limited, entries are preferably culled on a first-in first-out basis, so that older items are removed prior to newer items. In some cases, a user may be able to retrieve an item from the peer-to-peer file system even though it has been deleted from the relevant peer-to-peer cache.

With respect to artifacts, e.g. the items generated by or shared with the group during their sessions, such as annotated pictures, etc., these artifacts may be saved in the same manner as the group history. Thus, a user can elect to view an annotated photograph that was generated during a prior group session, with the understanding that in an environment of limited memory, certain older items may at some point become unavailable.

Having discussed the user interface aspects of the group space and associated graphical items, the underlying modular group framework will now be discussed in greater detail. It is desirable that the group space application be extensible so that activities may be added over time, in addition to the activities already provided with the application upon distribution. Accordingly, the programmatic configuration of the underlying group interaction application is preferably modular so that additional activity modules may be constructed by third parties to interface with the application. Thus, for example, a photo activity module that is accessed by the group interaction application provides the photo activity functionality. Similarly, the audio activity functionality is provided by an audio activity module. Additional modules could be for example, a shared journal activity module, a "jam session" activity module, and game activity modules.

Figure 8:
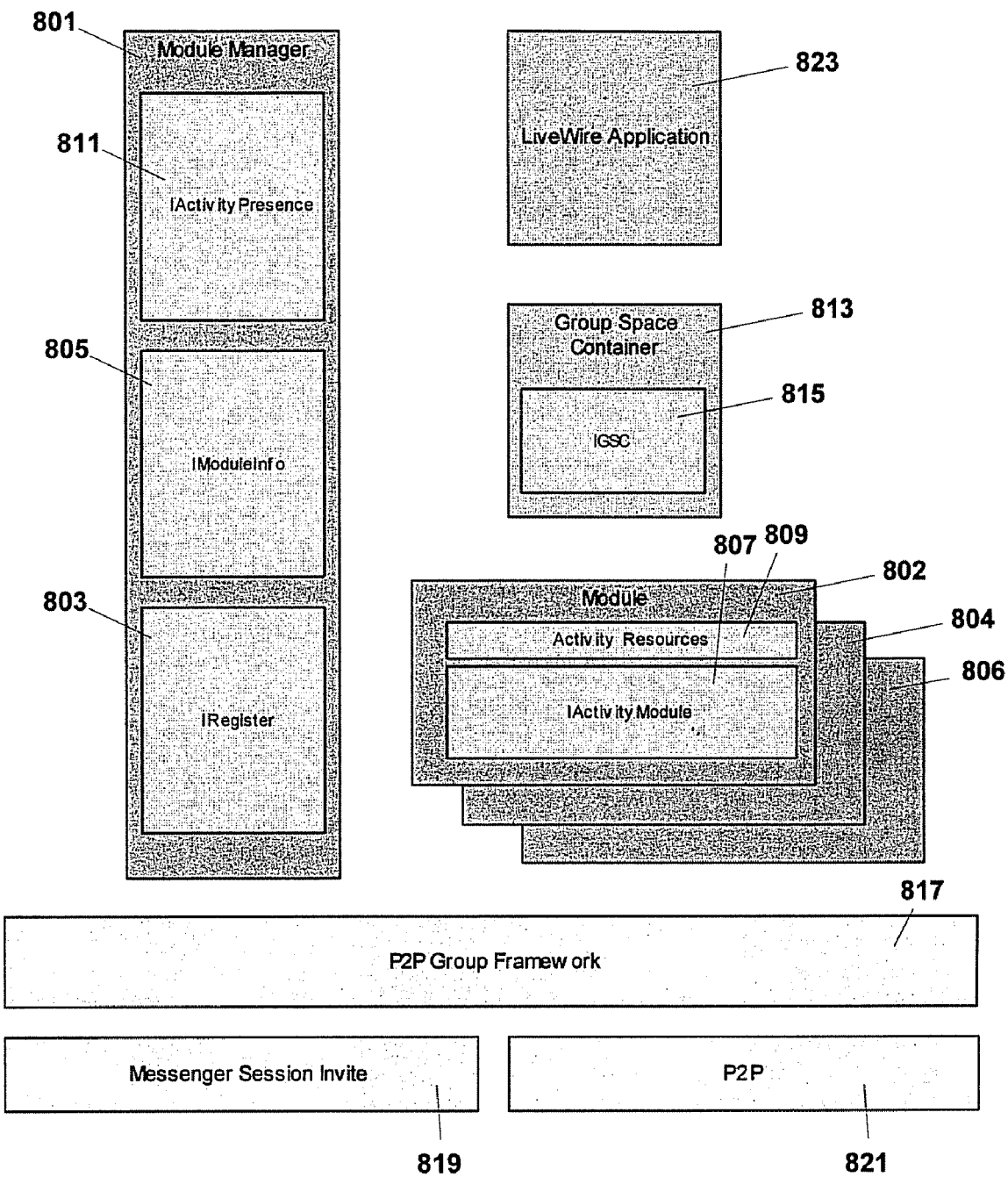
FIG. 8 is a schematic diagram showing the modular nature and components of an application according to an embodiment of the invention.

The schematic diagram of FIG. 8 illustrates the modular nature and programmatic components of the group interaction application. The primary component of the architecture is the module manager 801. The module manager presents an interface such as IRegister 803 for allowing additional activity modules such as modules 802, 804, and 806 to install and uninstall themselves from the group interaction application 813. Each module comprises an activity interface, such as IActivityModule 807, as well as activity resources 809, such as for example, clip art. As part of the install process, the module to be added provides information about itself, such as through an IModuleInfo interface 805, sufficient to allow the module to be loaded from a group space menu or other access point. In addition, the module should provide sufficient information to allow the group interaction application 813 to supply module-specific user interface elements and module-specific help information. This information is useful additionally when a file is automatically transferred into the group space such as by a drag and drop operation. In this case, the module identifying information is used to ensure that the proper module is loaded, if need be, and that in any case, the file is dropped into the appropriate module. An activity notification interface such as IActivityPresence 811 on the module manager 801 is usable to notify other users of similar modules that the user of the present module is active in the module. Thus, for example, a group member having a photo activity module may be notified via IActivityPresence 811 when another group member is active in their respective photo activity module.

Each module interacts with both the module manager 801 and the group space container module 813 which is primarily responsible for presenting the group space 401 and processing events, commands, etc., therein. An appropriate interface to the group space container module 813 is provided, such as IGSC 815. Both the group space container 813 and the module manager 801 have access to a peer-to-peer group framework 817, which is described in further detail with respect to FIG. 9. The framework 817 in turn accesses messenger facilities 819 for sending invitations and so forth, as well as a peer-to-peer interface 821 for accessing the peer-to-peer network services and functions.

Note that a "LiveWire" application 823 optionally also interfaces with the module manager 801, the group space container 813, and the group framework 817 to perform its functions. The livewire application performs and facilitates various functions as outlined in U.S. patent application Ser. No. 10/174,422, filed on Jun. 18, 2002, by Zaner et al., entitled "Visual Group Interface For Group Connectivity," which is herein incorporated by reference in its entirety for all that it teaches without limitation whatsoever to any particular subject matter.

Figure 9:
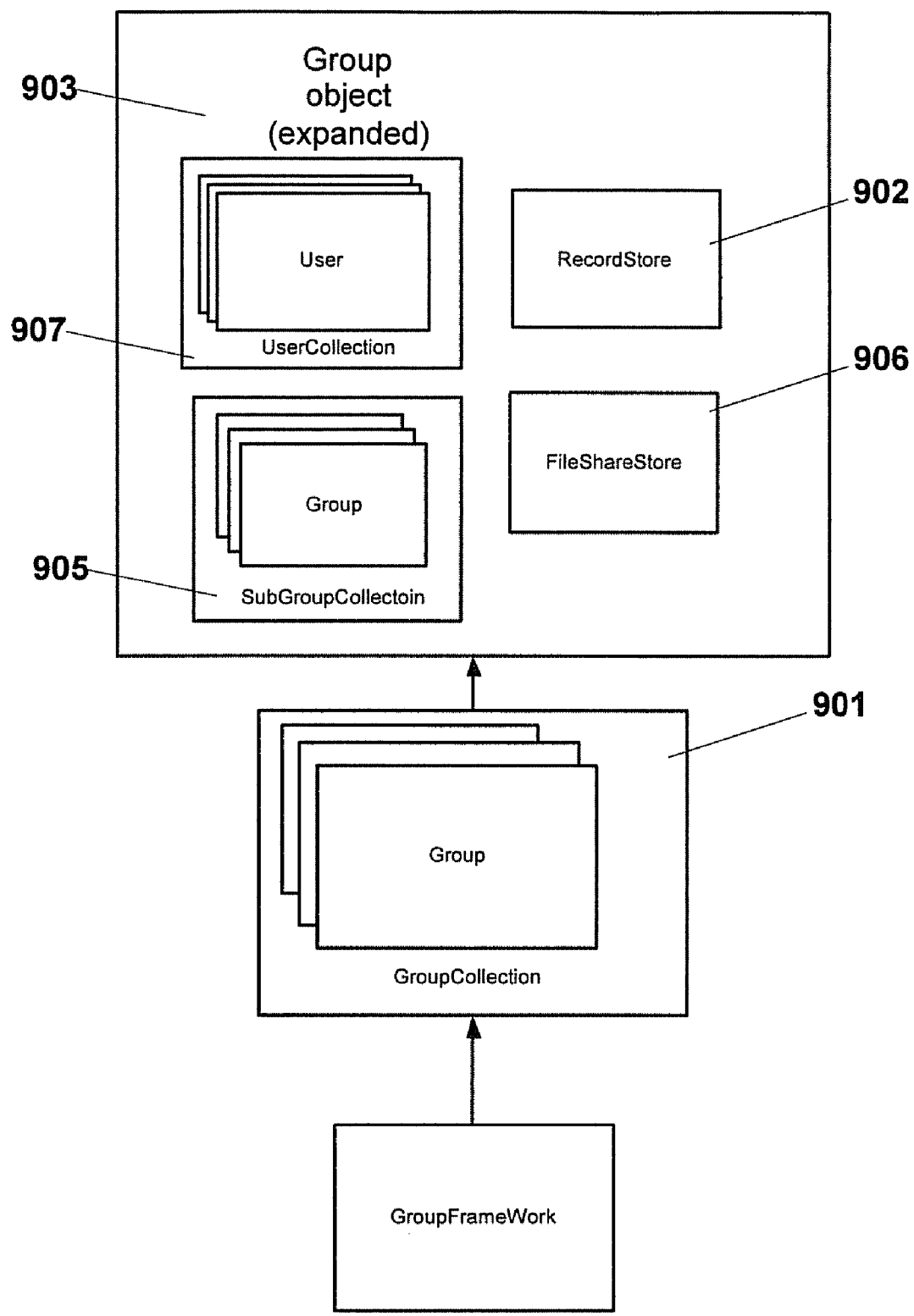
FIG. 9 is a schematic diagram showing a group framework employed by an application according to an embodiment of the invention to facilitate group management and functionality.

The group framework is illustrated in greater detail schematically in FIG. 9. The group framework is an API that exposes a set of group objects 901 such as group object 903 (shown expanded). A group is essentially a set of people, or more precisely their machines, as represented in user collection 907, that are connected over a network with a synchronized database, file store, and the ability to send transient messages to each other.

Group objects can be sandboxed in two ways. The first way is through their application ID. If a group object requests a record store 905 (or filestore, etc) based on their application ID, they will only see records stored by them. Another way in which to sandbox a group is through sub-groups, such as in subgroup collection 905. A sub-group is essentially a "pointer" to a separate group object. The object of a sub-group is to create a "child group" so that an application can have secure temporary members. If a temporary member is invited to the subgroup, once they leave, they cannot access the original group because it is a separate group. This is also useful in establishing a transient session when not all members of the group want to receive all the network data of an activity that is transpiring.

The group object 903 thus comprises a record store 902 and a file share store 906. Both stores 906 and 902 are distributed. In particular, the file share store 906 is a distributed file system that provides shared files to group members. Optimally the network of group members is arranged so that file transfer occurs efficiently, i.e. such that lower bandwidth members are topographically located further toward the fringe of the network, whereas higher bandwidth members are preferably located more centrally and are used to further fan materials to other members. The record store 902 is essentially a distributed shared database.

Figure 10:
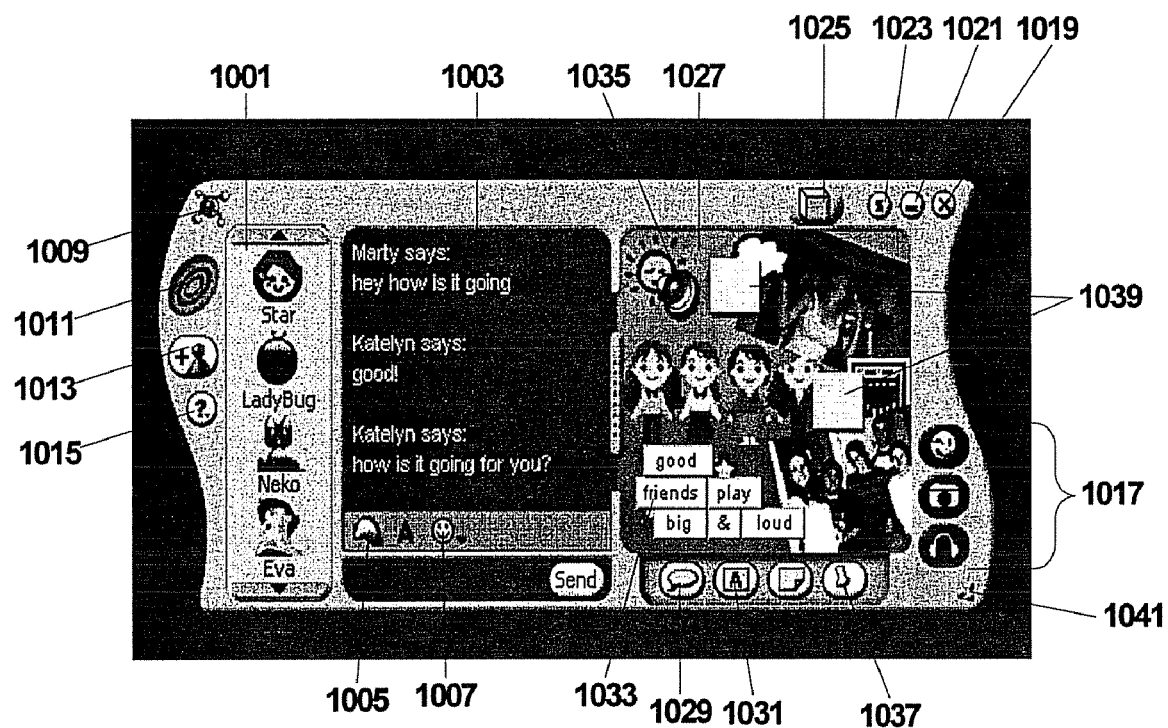
FIG. 10 is a display screen representation of an alternative group space configuration including additional alternative activities and functionalities according to an embodiment of the invention.

FIG. 10 shows an alternative group space representation including additional activities and functionality. Although a number of the areas and features shown perform a function similar to embodiments described above, certain aspects differ. The group space controls will be briefly described. The group icon 1009 identifies the group associated with the space. The drop target 1011 allows a user to drop a photograph, texture, etc and thereby to skin the entire group space accordingly. By selecting the invite button 1013, the user can invite another participant into the group. A standard help button 1015 is preferably provided to allow users to access help materials regarding the use of the group space, as well as its functionalities and features.

A graphical list 1017 provides a launch point for various activities through user selection of the appropriate icon. The activity icons illustrated include icons for an audio activity, a scrapbook activity, and a chat activity. As more activities become available, due to the modular nature of the underlying group interaction application, more icons will be placed in the list 1017. Other controls include a "close" control 1019, a "minimize" control 1021, and a "return to original configuration" control 1023. The latter is usable to return the shape and skin of the space, which are user alterable, to an original state reflecting a configuration prior to user alteration.

A memory cube icon 1025 allows users to save activities, providing an alternative history mechanism to that described earlier. In particular, after selecting the memory cube icon 1025, the user is then prompted to indicate which activities to save. For example, a dialog will prompt the user to select any or all of the ongoing activities, such as a chat discussion, a scrapbook activity, and an audio activity. After selecting which activities to save, the application saves the activities in their present state without halting the activity, to a file represented graphically in an embodiment of the invention as a cube. The saving step is accompanied preferably in an embodiment of the invention by an origami animation "folding" the selected activities into a cube. The user may be prompted for a save location, with the user's desktop being the preferred default location.

The history saved in this manner may be used in any way that the user desires. For example, the memory cubes may organized in files, positioned on the desktop, dragged and dropped onto the corkboard (to be discussed hereinafter) for viewing, listening, or reading by the other group members, shared via email or instant messaging, posted on web sites or web logs, etc. In an embodiment of the invention, however, the memory cubes are not editable. This is because one purpose that many users will want to employ the cubes for is to capture the emotion and spontaneity of a moment. To allow editing would tend to defeat this purpose as many users would edit the cubes to achieve a "perfect" memory rather than preserve what really transpired. Of course, editing may be allowed in embodiments according to designer and/or user preferences.

The memory cubes may be implemented in either of two ways. In the first, the memory cube is an individual feature, so that a user may cube an activity without notifying or disturbing any of the other members. Alternatively, the memory cube is a group feature so that any member can access the cube, the saved history being stored in the group storage at a shared group server.

The scrollable group member icon/name listing 1001 performs a function similar to that above. Similarly, the chat space 1003 is usable in the manner described earlier. In addition, a control such as the fortune cookie control 1005 is usable to provide conversation starters, jokes, ice-breakers and so on. In particular, by manipulating the control 1005, the user is able to insert a joke, little-known fact, etc. into the conversation, wherein the material is selected randomly from a database of such material. Users can supplement the database with other materials as desired. The emoticon control 1007 is manipulated by the user to insert a selected emoticon (an icon that conveys emotion) into the conversation. In an embodiment of the invention, the control 1007 yields a dropdown list of emoticons for selection.

At the left of the group space, a group corkboard 1027 is displayed. The corkboard 1027 acts in a similar fashion to a physical work space or dormitory corkboard, in that users are free to post materials to the corkboard 1027 for others to observe. Any type of material may be posted to the corkboard by any member, including textual, graphical, pictorial, photographic, animated, video, and audio materials. The corkboard 1027 acts as a drop target, accepting dragged and dropped materials such as files. Files appear on the corkboard as icons (such as a speaker 1035 for audio files, a paper icon for textual files), although in an embodiment of the invention pictures appear as thumbnails. By clicking on the relevant icon or thumbnail, the user is shown a larger image in the case of visual materials, and in the case of audio materials (or audio portions of visual materials such as a video sound track) the material is audibly presented via speakers.

Controls situated near the corkboard may also be used to add materials thereto. For example, a balloon icon 1029 can be selected by the user to add a cartoon word balloon or thought balloon to the corkboard, typically associated with a particular image, such as of a person. Upon selecting the icon 1029, the user is presented with a dialog box prompting the user through the process of creating and posting the balloon. A "magnetic letters" icon 1031 can be selected to present a list of letters and words for the user to assemble into a message 1033 to post to the corkboard 1027. Similarly, a stick on note icon 1037 can be used to post short notes 1039 onto the corkboard 1027. By selecting the icon, the user is provided with an area to enter a textual message, which the user can then post the message to the board 1027 as a note 1039. The user can position the note on the board by dragging. In an embodiment of the invention, the notes 1039 are not typically legible on the board, but are openable by selection, such as by double-clicking, to display a larger and legible version. It will be appreciated that any other corkboard controls, such as a "sticker" control (to allow selection and placement of "stickers") may additionally or alternatively be provided without limitation depending upon designer and user preferences.

Figure 11:
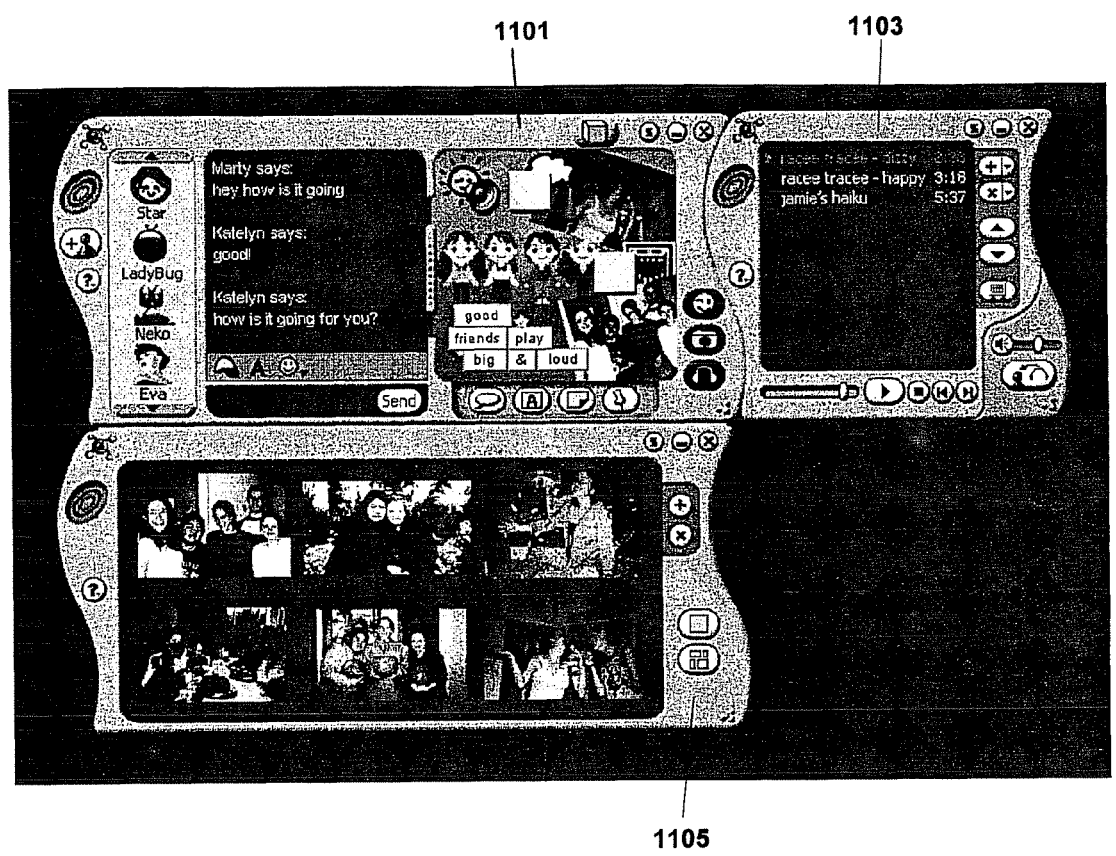
FIG. 11 is a display screen representation of an alternative group space configuration combined with additional activity spaces according to an embodiment of the invention.

In an embodiment of the invention, activity modules are resizable, such as by grip 1041, and dockable and may be "snapped" onto the group space by placing them adjacent to one another. FIG. 11 illustrates a conglomeration of a group space 1101, an audio sharing activity 1103, and a scrapbook activity 1105. It can be seen that the mating sides of the components 1101, 1103, 1105 are shaped to come together smoothly to form a unified visual display if the user so chooses.

Figure 12:
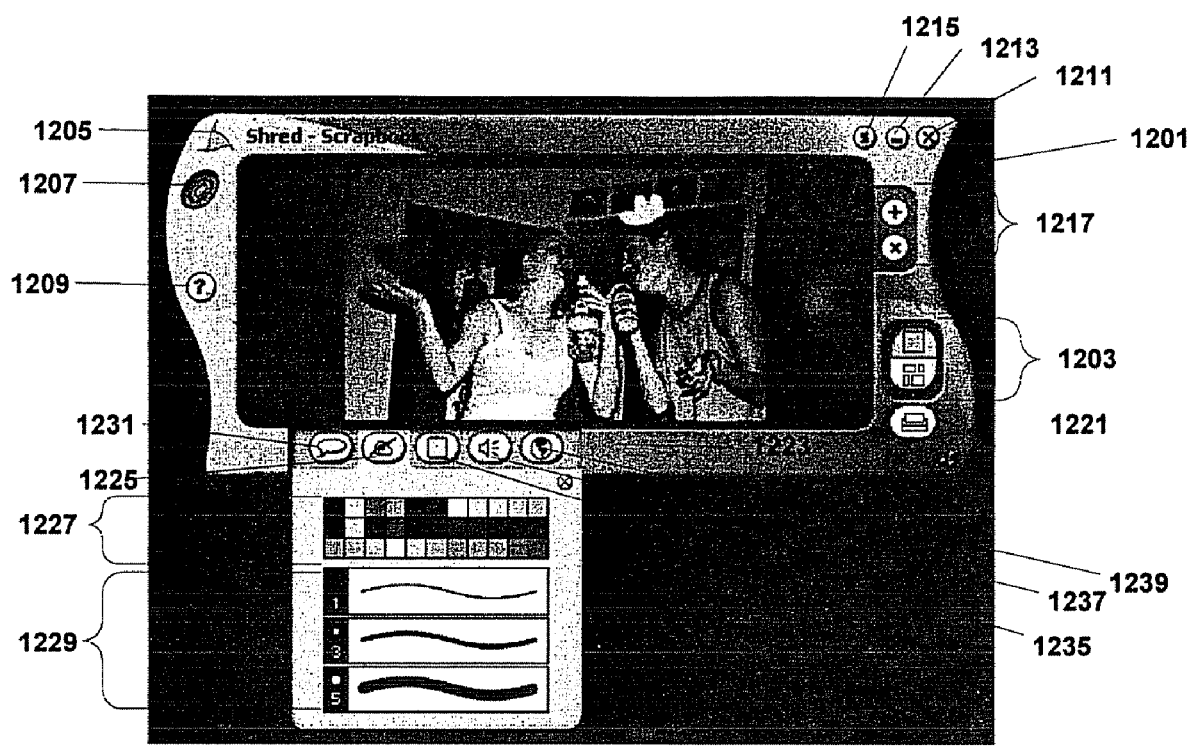
FIG. 12 is a display screen representation according to a scrap book activity within an embodiment of the invention.
Figure 13:
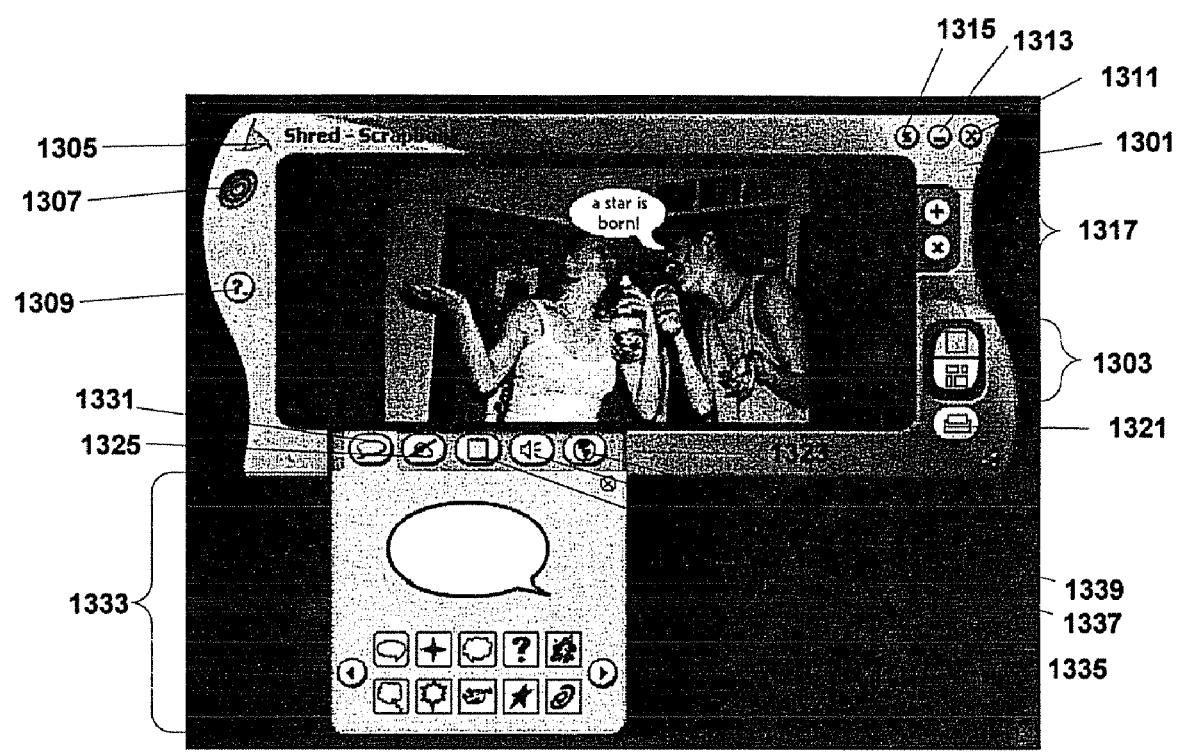
FIG. 13 is an alternative display screen representation according to a scrap book activity within an embodiment of the invention.

A scrapbook activity is provided in an embodiment of the invention to allow a user to create a virtual scrapbook. FIGS. 12 and 13 illustrate exemplary user interfaces for the scrapbook activity in embodiments of the invention. The scrapbook 1201, 1301 is usable to create a group (or personal) artifact comprised of photographs and other materials. The scrapbook 1201, 1301 opens up empty in a collage view, for a new scrapbook, and can then be filled and populated by the user. For example, photographs can be dragged and dropped into the scrapbook 1201, 1301, and dragged within the scrapbook 1201, 1301. The scrapbook supports one or both of two views in embodiments of the invention, the first being a collage view, and the second being a single view. In an embodiment of the invention, a view control 1203, 1303 allows the user to select either the collage view or the single view. In the single view, a page forward/backward control (not shown) may be provided to allow the members to flip through the scrapbook photograph-by-photograph. In the collage view, a similar control may be provided to allow members to scroll across the scrapbook.

It can be seen that the scrapbook activity shares a number of features with the other windows discussed herein. For example, the scrapbook preferably supports a group icon 1205, 1305, a skin drop target 1207, 1307, a help button 1209, 1309, a close control 1211, 1311, a minimize control 1213, 1313, and a "return to original state" control 1215, 1315. In addition, a supplemental control 1217, 1317 is selectable by the user to add or remove photographs from the scrapbook 1201, 1301. In an embodiment of the invention, a print control 1221, 1321, prints the scrapbook 1201, 1301, when selected. In a further embodiment, selection of the print control 1221, 1321 yields a prompt to the user to select the details of the print job, such as for example whether to print all or only one of the photos, what resolution to use, etc.

Finally, the scrapbook also preferably includes tools 1223, 1323 usable to annotate the photographs of the scrapbook. For example, a drawing control 1225, 1325, similar to that discussed above, can be used to draw on the photographs. A palette 1227 allows the user to select the color in which to draw, while a line selection field 1229 allows the user to select a line width in which to draw. A balloon control 1231, 1331 is selectable to allow a user to place a cartoon word or thought balloon on a photograph in the scrapbook as discussed above. In particular, selection of the balloon control 1231, 1331 yields a drop down array 1333 of selectable choices of balloon types to insert. Other annotation tools include a note tool 1235, 1335 usable to insert a note into the scrapbook, an audio insert tool 1237, 1337 usable to insert a selectable audio note into the scrapbook, and a map control 1239, 1339. The map control 1239, 1339 is selectable to access or input geographical information regarding a particular photograph, such as a location where the photograph was taken. Such geographical information may be presented in the form of a map, with one or more photographs situated on the map at particular locations as appropriate. As a group activity, the scrapbook is shared synchronously. That is, each group member sees the same view of the scrapbook as the other members. In addition, each can annotate the current view, and can see others' annotations as well.

The scrapbook has interesting benefits when one or more members are connected to the group via a mobile device such as a handheld phone or other mobile computing device. For example, the scrapbook can be used as a travel journal that is sharable with one's group members, either synchronously or asynchronously. For GPS equipped mobile devices, the GPS information can be automatically linked into the scrapbook, for example automatically providing a description or map of the location where a photograph is taken. There are many other ways in which the scrapbook can be used to share one member's mobile experience with other members that may or may not be mobile. For example, one member can shop for a prom dress, posting photographs of herself to the scrapbook as she tries on different dresses. In addition to simply observing, the other group members can comment on the dresses, or vote on which photograph looks best, to help the shopping member pick a dress.

In addition to the functionality described above, a number of other features may be implemented without limitation. For example, in addition to the file sharing functionality described above, a user may also, in an embodiment of the invention, allow other group members to "roam" their personal data, such as buddy lists, character images, skins, pictures, journals, audio files, etc. Additionally, in order to simplify the use of the group interaction application for users already established in alternative Internet messenger technologies, it is desirable both to allow communication to users of other Internet messenger technologies and to utilize the contact lists established by the user for such technologies to provide contact information for use within the group interaction application.

It will be appreciated that a novel application and interface for group interaction over a network have been described. In view of the many possible embodiments to which the principles of this invention may be applied, it should be recognized that the embodiments described herein with respect to the drawing figures are meant to be illustrative only and should not be taken as limiting the scope of the invention. Those of skill in the art will recognize that the elements of the illustrated embodiments shown in software may be implemented in hardware and vice versa or that the illustrated embodiments can be modified in arrangement and detail without departing from the spirit of the invention. For example, although the invention has been described primarily with reference to personal computers and their associated displays and desktops, it should be appreciated that the invention does not require a PC or a traditional desktop, but rather can also be implemented on other devices that support a visual display function. Therefore, the invention as described herein contemplates all such embodiments as may come within the scope of the following claims and equivalents thereof.

What is claimed is:

1. A computer-readable medium having thereon computer-executable instructions for providing an online group scrapbooking activity, the instructions comprising:

presenting to a first user at least one scrapbook tool icon and a representation of a scrapbook work area, the representation of the scrapbook work area displays at least one photograph and provides an equivalent representation of the scrapbook to at least one other user, the at least one scrapbook tool icon is selectable to create annotations in the scrapbook work area and includes at least one of: a drawing control, a palette allowing users to select color used with the drawing control, a balloon control, a note tool, an audio insert tool, or a map control;

receiving a selection of the at least one scrapbook tool icon by the first user;

displaying an annotation facilitated by the selection of the scrapbook tool icon in the representation of the scrapbook work area; and viewing the representation of the scrapbook and the equivalent representation of the scrapbook synchronously via a communication component, the communication component comprising at least one of a mobile phone device or a mobile computing device.

2. The computer-readable medium according to claim 1, the mobile phone device or mobile computing device further comprising global positioning system (GPS) functionality, the GPS functional mobile device providing GPS information automatically linked to the scrapbook, the GPS information including one or more of a description or a map of the location of the information.

3. The computer-readable medium according to claim 1, storing the scrapbook as an artifact in a file cache of a peer-to-peer network.

4. The computer-readable medium according to claim 1, further comprising adding or removing photographs from the scrapbook.

5. The computer-readable medium according to claim 1, further comprising annotating photographs displayed in the scrapbook work area.

6. The computer-readable medium according to claim 1, displaying annotations to the at least one other user further comprising displaying a map based on the location where one or more photographs were taken.

7. The computer-readable medium according to claim 1, further comprising changing the view of the scrapbook work area in response to input from the first user.

8. The computer-readable medium according to claim 1, further comprising printing the scrapbook of the first user.

9. The computer-readable medium according to claim 1, further comprising synchronously updating the view of the scrapbook presented to the first user and the at least one other user.

* * * * *